US012695315B1

(12) United States Patent
Liang

(10) Patent No.: US 12,695,315 B1
(45) Date of Patent: Jul. 28, 2026

(54) VEHICLE-MOUNTED CHARGER

(71) Applicant: Jianfei Liang, Kaiping City (CN)

(72) Inventor: Jianfei Liang, Kaiping City (CN)

( * ) Notice: Subject to any disclaimer, the term of this patent is extended or adjusted under 35 U.S.C. 154(b) by 0 days.

(21) Appl. No.: 19/380,491

(22) Filed: Nov. 5, 2025

(30) Foreign Application Priority Data

Mar. 13, 2025 (CN) .......................... 202520434055.7

(51) Int. Cl.
| | |
|---|---|
| *H02J 7/00* | (2026.01) |
| *B60R 11/00* | (2006.01) |
| *F21S 9/02* | (2006.01) |
| *F21V 17/16* | (2006.01) |
| *F21V 23/04* | (2006.01) |
| *F21V 23/06* | (2006.01) |
| *F21W 106/00* | (2018.01) |
| *F21Y 115/10* | (2016.01) |
| *H02J 7/34* | (2006.01) |
| *H02J 7/50* | (2026.01) |
| *H02J 7/70* | (2026.01) |
| *H02J 7/80* | (2026.01) |

(52) U.S. Cl.
CPC .............. *H02J 7/485* (2026.01); *B60R 11/00* (2013.01); *F21S 9/02* (2013.01); *F21V 17/164* (2013.01); *F21V 23/04* (2013.01); *F21V 23/06* (2013.01); *H02J 7/342* (2020.01); *H02J 7/50* (2026.01); *H02J 7/70* (2026.01); *H02J 7/80* (2026.01); *B60R 2011/0054* (2013.01); *F21W 2106/00* (2018.01); *F21Y 2115/10* (2016.08); *H02J 2207/30* (2020.01)

(58) Field of Classification Search
CPC .... H02J 7/485; H02J 7/342; H02J 7/50; H02J 7/70; H02J 7/80; H02J 7/0042; B60R 11/00; F21S 9/02; F21V 17/164; F21V 23/04; F21V 23/06
See application file for complete search history.

(56) References Cited

U.S. PATENT DOCUMENTS

| | | | | |
|---|---|---|---|---|
| 12,132,337 | B1 * | 10/2024 | Xu ......................... | H02J 7/0042 |
| 2012/0176083 | A1 * | 7/2012 | Chang ................... | H02J 7/0042 |
| | | | | 320/107 |
| 2020/0410974 | A1 * | 12/2020 | Feng ................ | G10K 11/17823 |

FOREIGN PATENT DOCUMENTS

| | | | | | |
|---|---|---|---|---|---|
| CN | 117118017 | A | * 11/2023 | ............ | H02J 7/0042 |
| KR | 101788217 | B1 | * 10/2017 | ............ | H02J 7/0042 |

OTHER PUBLICATIONS

Machine translation of KR_101788217_B1 (Year: 2026).*

* cited by examiner

*Primary Examiner* — David V Henze
(74) *Attorney, Agent, or Firm* — JEEN IP LAW, LLC

(57) ABSTRACT

A vehicle-mounted charger includes a housing, a printed circuit board (PCB) disposed in the housing, and a universal serial bus (USB) female socket, a TYPE-C female socket, and a direct current (DC) female socket disposed on the PCB. The housing includes an upper shell and a bottom shell. The upper shell is provided with an upper port and a lower port. The bottom shell is detachably connected to the lower port of the upper shell. A cover plate is disposed at the upper port of the upper shell. Jack structures, which are in one-to-one correspondence with the respective female socket interfaces and respectively adapted to the shapes thereof, are disposed on the cover plate.

9 Claims, 7 Drawing Sheets

504

505

506

VEHICLE-MOUNTED CHARGER

CROSS-REFERENCE TO RELATED APPLICATIONS

The present disclosure claims the priority of Chinese Patent Application No. 202520434055.7 filed on Mar. 13, 2025 before CNIPA. All the above are hereby incorporated by reference in their entirety.

TECHNICAL FIELD

The present disclosure relates to the technical field of chargers, and in particular to, a vehicle-mounted charger.

BACKGROUND

A vehicle-mounted charger, plugged into a cigarette lighter socket of a vehicle, is configured to charge portable electronic devices carried by people, such as mobile phones, iPads, smart bracelets, and power banks. To meet usage requirements of people, a variety of vehicle-mounted chargers with different structures and functions are currently available on the market.

However, all vehicle-mounted chargers in the prior art only support USB ports, which results in failure to directly charge the electronic devices carried by users when the plug types of the electronic devices are incompatible with the USB ports of the vehicle-mounted chargers. For example, some new models of cellphones adopt Type-C ports, and some electronic devices such as digital cameras and portable speakers adopt DC ports. In the case that the vehicle-mounted chargers only have the USB ports, the vehicle-mounted chargers cannot charge such electronic devices. Therefore, the applicant provides a vehicle-mounted charger with various port structures.

SUMMARY

An objective of the present disclosure is to provide a vehicle-mounted charger with various interface structures, to solve the problem that vehicle-mounted chargers in the prior art only support the USB ports and are limited in usage scenarios.

The present disclosure is implemented as follows: A vehicle-mounted charger includes a housing, a printed circuit board (PCB) disposed in the housing, and a universal serial bus (USB) female socket, a TYPE-C female socket, and a direct current (DC) female socket disposed on the PCB. The housing includes an upper shell and a bottom shell. The upper shell is provided with an upper port and a lower port. The bottom shell is detachably connected to the lower port of the upper shell. A cover plate is disposed at the upper port of the upper shell. Jack structures, which are in one-to-one correspondence with the respective female socket interfaces and respectively adapted to the shapes thereof, are disposed on the cover plate.

Further, an internal thread structure is disposed on the lower port of the upper shell, an external thread structure is disposed on the upper port of the bottom shell, and the bottom shell and the upper shell are connected through the thread structures.

Further, the upper shell includes a plug-in portion and a handheld portion, the handheld portion is located at an upper end of the plug-in portion, cross sections of the plug-in portion and the handheld portion are all circular and the plug-in portion and the handheld portion share a common central axis, an outer diameter of the handheld portion is greater than an outer diameter of the plug-in portion, and the plug-in portion is configured to be inserted into a cigarette lighter socket of a vehicle.

Further, two oppositely formed negative electrode through holes are formed in the plug-in portion, two elastic negative electrodes are disposed on the housing, and the two elastic negative electrodes pass through the two negative electrode through holes, respectively; and a positive electrode is disposed at a lower end of the bottom shell, and the elastic negative electrodes and the positive electrode are all electrically connected to the PCB.

Further, a positive electrode connecting wire and a positive electrode spring are further disposed on the housing, a length direction of the positive electrode spring is along a vertical direction of the housing, an upper end of the positive electrode connecting wire is connected to the PCB and a lower end thereof is connected to a lower end of the positive electrode spring, and the positive electrode spring presses the lower end of the positive electrode connecting wire against an inner wall of the positive electrode.

Further, a plurality of light emitting diode (LED) lamp beads are arranged in the handheld portion along a circumferential direction, lamp holes in one-to-one correspondence with the LED lamp beads are formed in the handheld portion, and the LED lamp beads are all electrically connected to the PCB.

Further, a control switch is disposed on the PCB, the control switch is configured to control turnon and turnoff of the LED lamp beads, a switch hole is formed in the cover plate at a position corresponding to the control switch, and an upper end of the control switch passes through the switch hole.

Further, a storage battery is disposed in the housing, the storage battery is electrically connected to the PCB, and the storage battery is capable of supplying power to the LED lamp beads.

Further, a display screen is disposed on the PCB, and a display window is disposed at a position of the cover plate corresponding to the display screen or the entire cover plate is made of a light-transmitting material.

Further, the cover plate is disc-shaped, a plurality of elastic walls are arranged along a circumferential direction of the cover plate at an outer end of the cover plate, a snap-fit protrusion is disposed on each of the elastic walls, a snap-fit structure adapted to the snap-fit protrusion is disposed on an inner wall of the handheld portion, and the cover plate is snap-fitted into the upper port of the handheld portion.

Compared with the prior art, the present disclosure has the following beneficial effects:

1. The USB female socket interface, the TYPE-C female socket, and the DC female socket are disposed on the vehicle-mounted charger provided by the present disclosure, and can charge various electronic devices with the USB port, the TYPE-C port, and the DC port, such that usage scenarios are effectively expanded.

2. The plurality of LED lamp beads of the vehicle-mounted charger provided by the present disclosure are arranged in the housing along the circumferential direction, and the lamp holes in one-to-one correspondence with the LED lamp beads are formed in the handheld portion of the housing, such that the vehicle-mounted charger provided by the present disclosure can be inserted into the cigarette lighter socket and used as a lighting lamp. The vehicle-mounted charger can better illuminate the inner bottom of the vehicle, facilitating the user to find articles that have fallen onto the inner bottom of the vehicle.

3. The storage battery is further disposed in the housing of the vehicle-mounted charger provided by the present disclosure, the storage battery is electrically connected to the PCB and can supply power to the LED lamp beads, the control switch is disposed on the PCB, and the control switch is configured to control turnon and turnoff of the LED lamp beads. Thus, after the vehicle-mounted charger provided by the present disclosure is separated from the cigarette lighter socket, the vehicle-mounted charger can also be used as a lighting lamp before the storage battery is depleted, which further expands the usage scenarios of the vehicle-mounted charger provided by the present disclosure.

Figure 1:
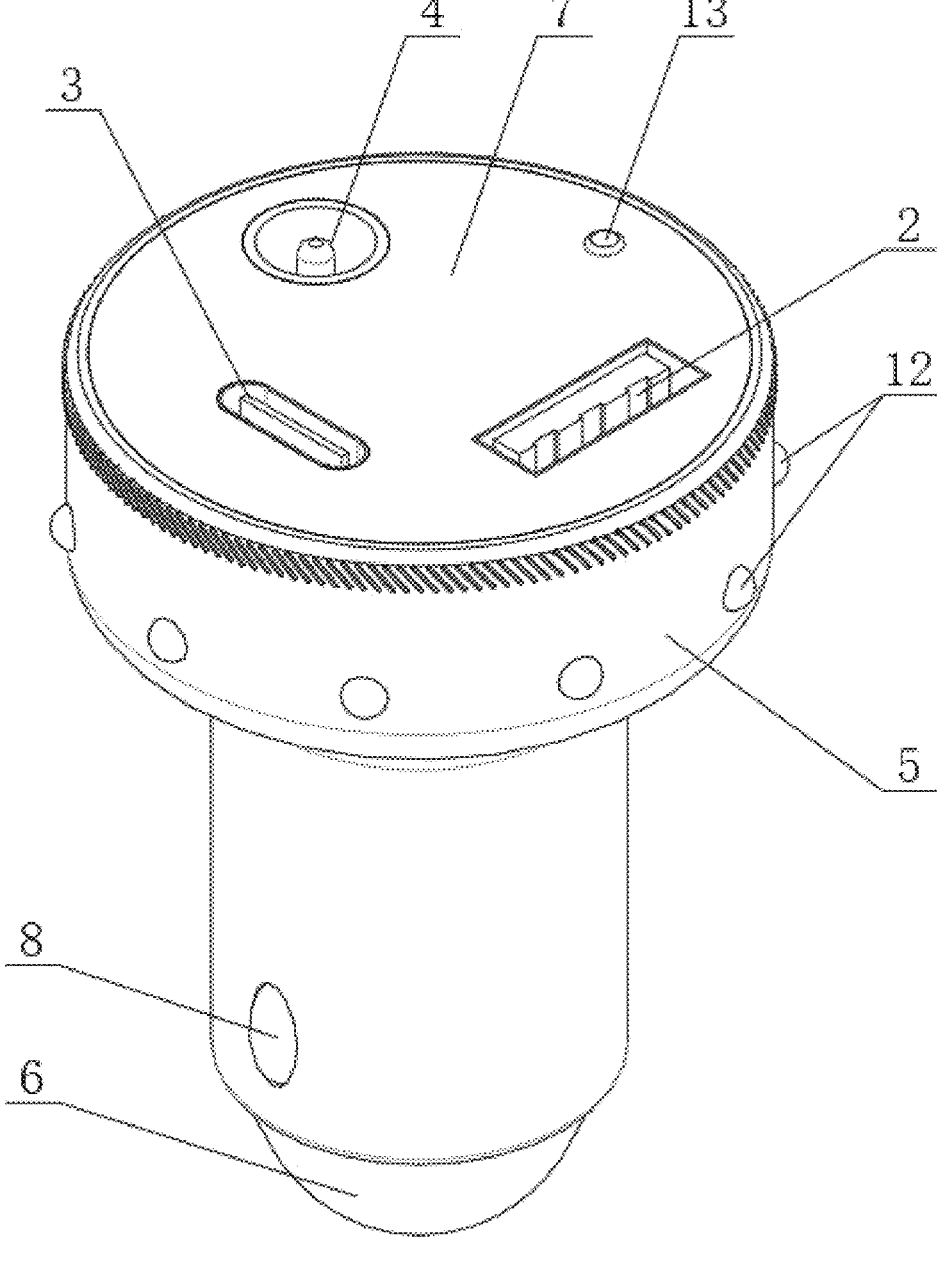
FIG. 1 is a schematic perspective view of the present disclosure.
Figure 2:
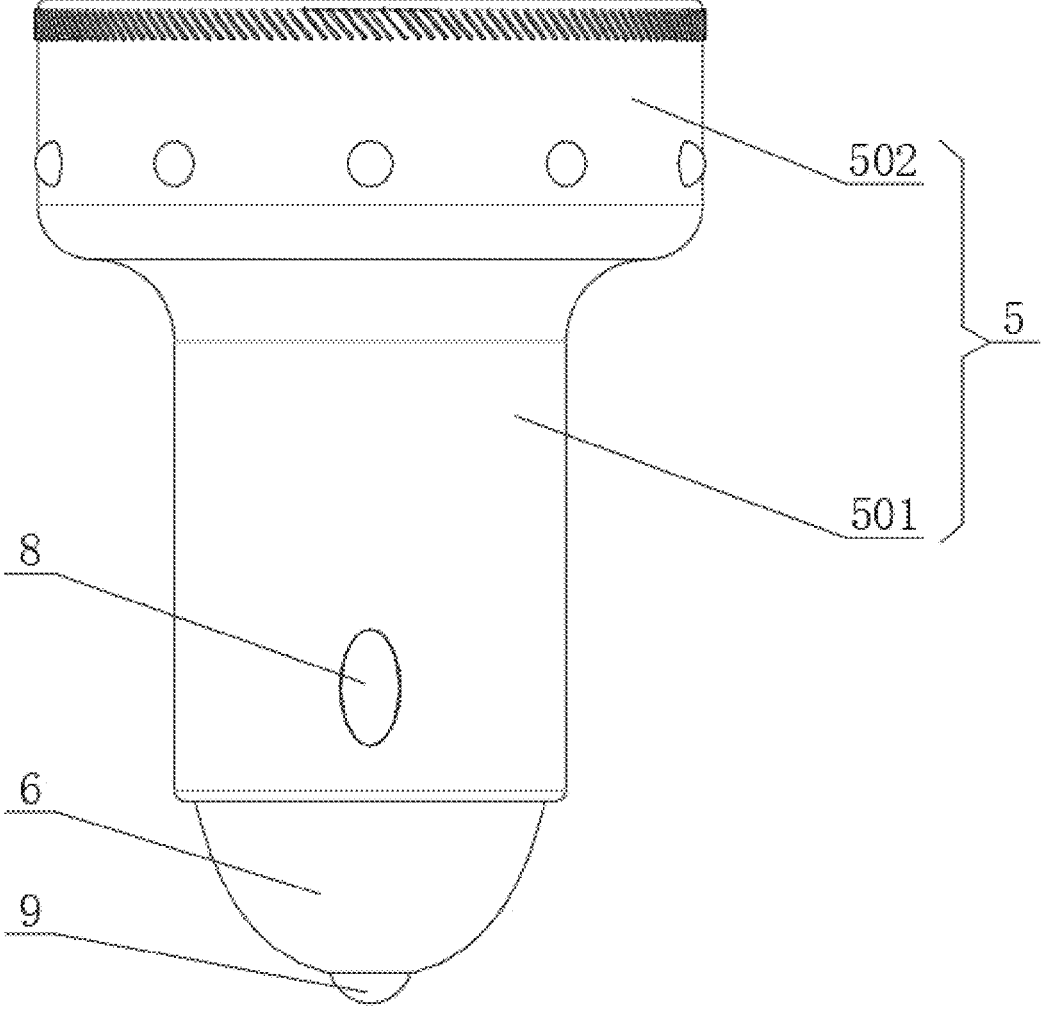
FIG. 2 is a front view of the present disclosure.
Figure 3:
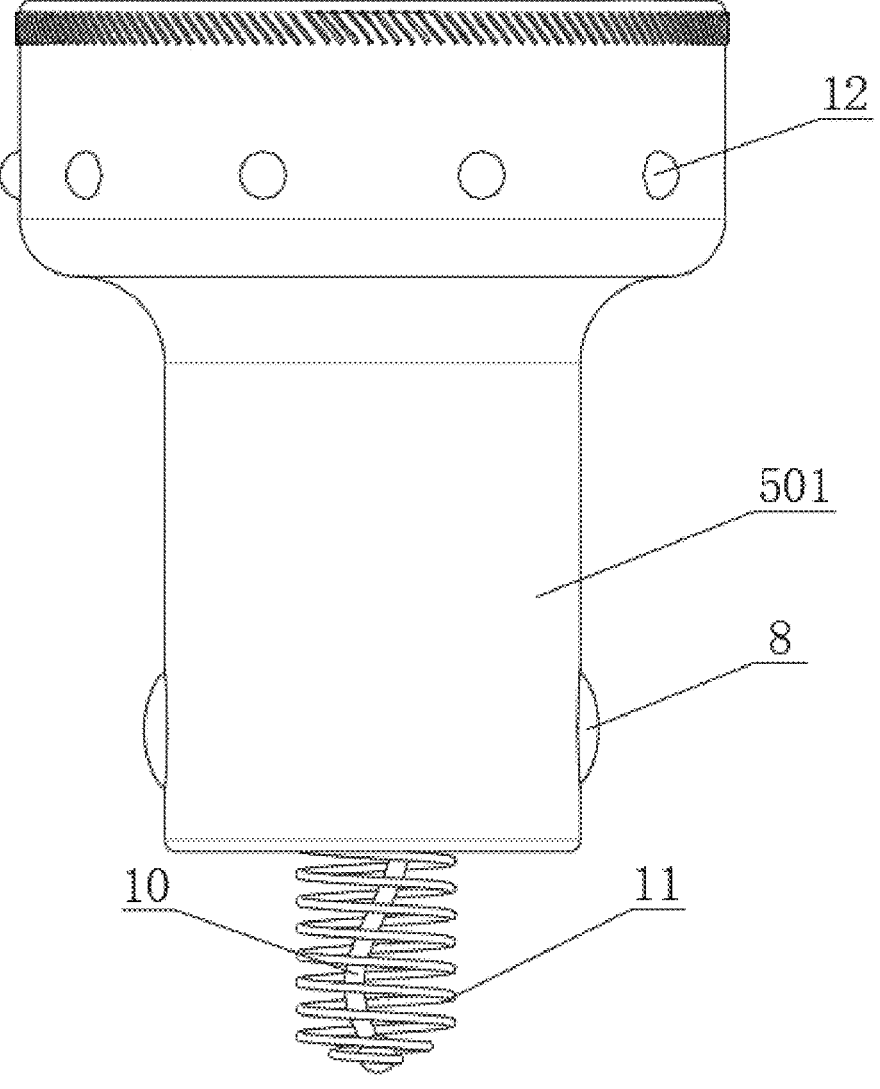
FIG. 3 is a front view of the present disclosure without a bottom shell.

Reference numerals in the figures: 1—PCB; 2—USB female socket; 3—TYPE-C female socket; 4—DC female socket; 5—upper shell; 501—plug-in portion; 502—handheld portion; 503—upper port; 504—lower port; 505—internal thread structure; 506—negative electrode through hole; 6—bottom shell; 601—external thread structure; 7—cover plate; 701—jack structure; 702—switch hole; 703—elastic wall; 704—snap-fit protrusion; 8—elastic negative electrode; 9—positive electrode; 10—positive electrode connecting wire; 11—positive electrode spring; 12—LED lamp beads; 13—control switch; 14—display screen; and 15—storage battery.

DETAILED DESCRIPTIONS OF THE EMBODIMENTS

In the present disclosure, unless explicitly specified and defined otherwise, the terms "mount", "interconnect", "connect", and "fix" should be understood in a broad sense. For example, the terms may indicate a fixed connection, a detachable connection, or an integral connection, may indicate a mechanical connection or an electrical connection, may indicate a direct connection or an indirect connection via an intermediate medium, or internal communication between two elements or an interaction relationship between two elements. Those of ordinary skill in the art can understand specific meanings of these terms in the present disclosure according to specific conditions.

Figure 6:
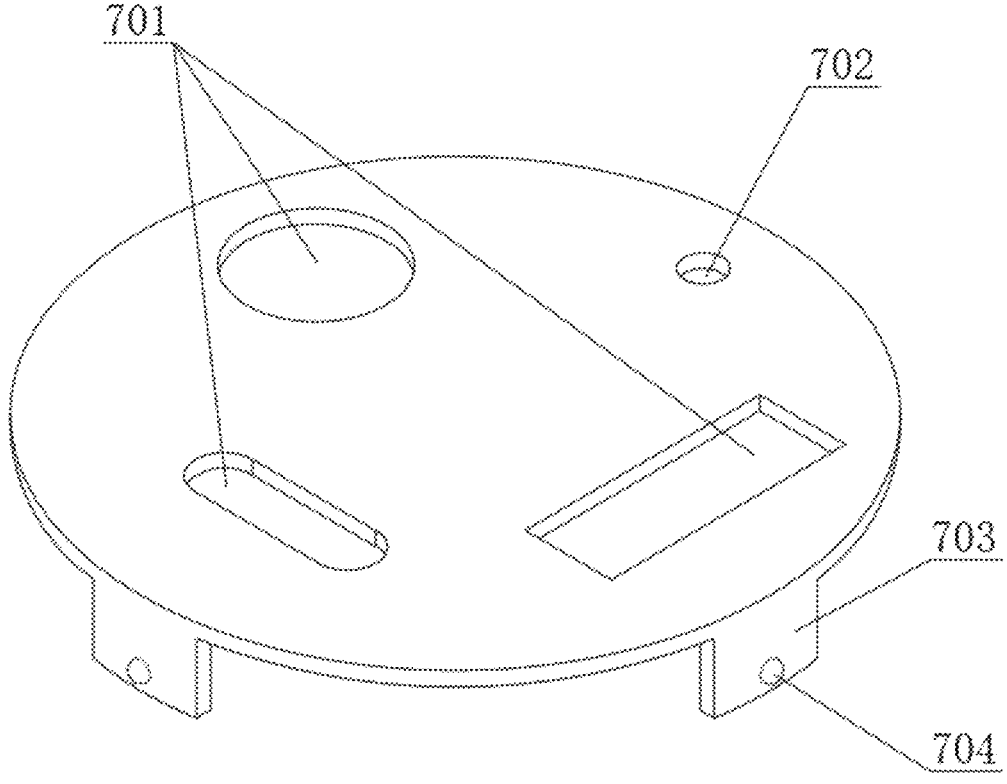
FIG. 6 is a schematic perspective view of the cover plate of the present disclosure.
Figure 7:
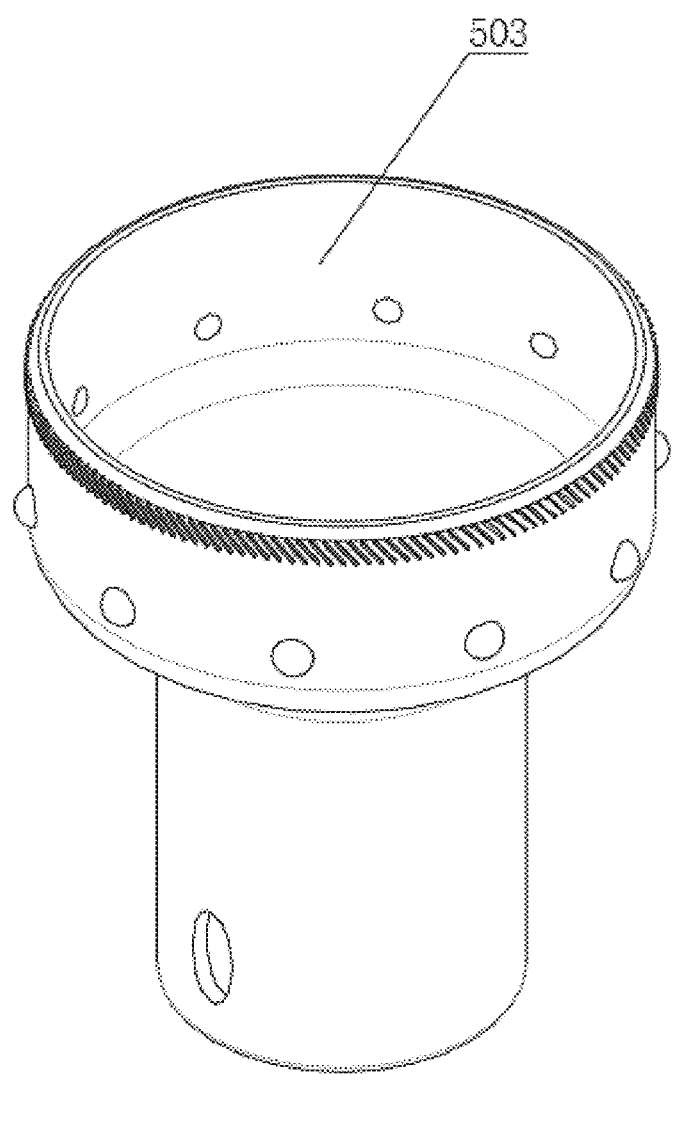
FIG. 7 is a schematic perspective view of the upper shell of the present disclosure from a first viewing angle.
Figure 8:
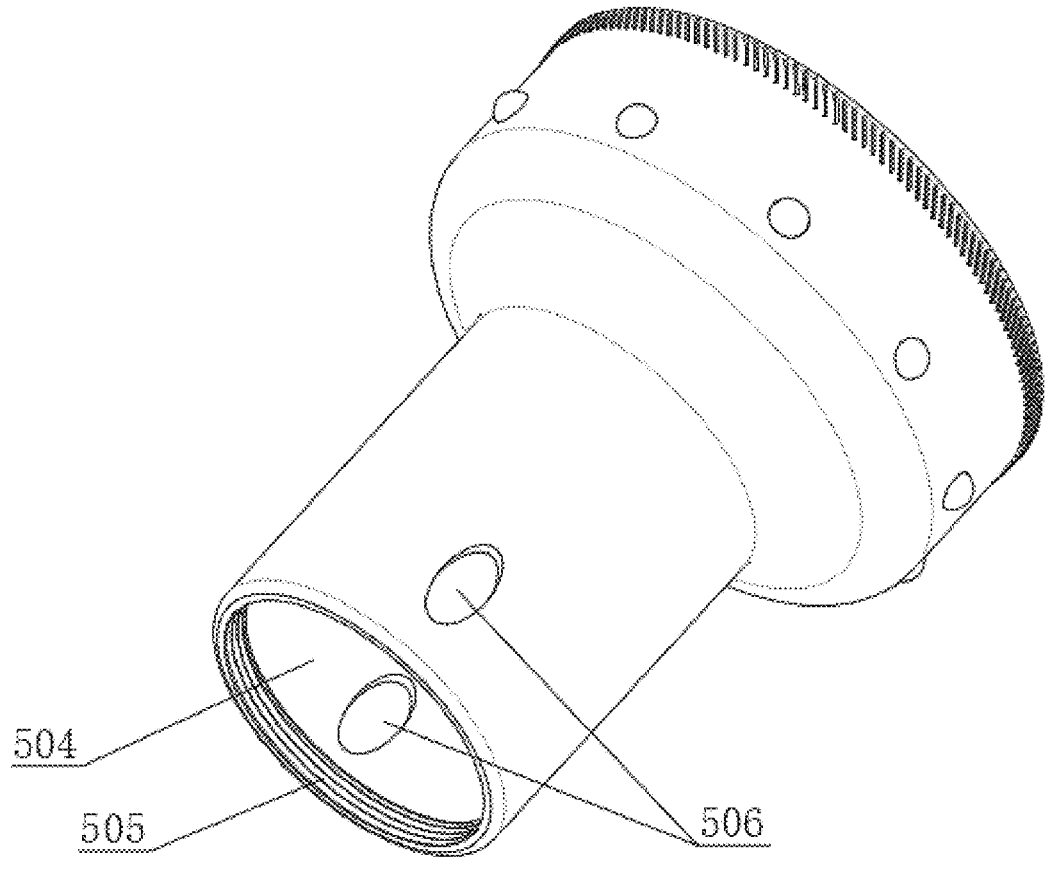
FIG. 8 is a schematic perspective view of the upper shell of the present disclosure from a second viewing angle.

A further description will be made below in conjunction with drawings and specific embodiments:

As shown in FIG. 1, and FIGS. 4-8, a vehicle-mounted charger includes a housing, a PCB 1 disposed in the housing, a universal serial bus (USB) female socket 2, a TYPE-C female socket 3, and a direct current (DC) female socket 4 disposed on the PCB 1, and a cover plate 7. The housing includes an upper shell 5 and a bottom shell 6, where the upper shell 5 is provided with an upper port 503 and a lower port 504, and the bottom shell 6 is detachably connected to the lower port 504 of the upper shell 5, as shown in FIGS. 7 and 8. The detachable structure between the bottom shell 6 and the upper shell 5 includes a snap-fit connection, a threaded connection, and the like. For example, an internal thread structure 505 is disposed on the lower port 504 of the upper shell 5 (see FIG. 8), an external thread structure 601 is disposed at an upper end of the bottom shell 6, and the bottom shell 6 and the upper shell 5 are connected through the thread structures. A cover plate 7 is disposed at the upper port 503 of the upper shell 5 (see FIG. 7). Jack structures 701, which are in one-to-one correspondence with the respective female socket interfaces and respectively adapted to the shapes thereof, are disposed on the cover plate 7.

As shown in FIGS. 1-4, the upper shell 5 includes a plug-in portion 501 and a handheld portion 502, the handheld portion 502 is located at an upper end of the plug-in portion 501, cross sections of the plug-in portion 501 and the handheld portion 502 are all circular and the plug-in portion 501 and the handheld portion 502 share a common central axis, an outer diameter of the handheld portion 502 is greater than an outer diameter of the plug-in portion 501, and the plug-in portion 501 is configured to be inserted into a cigarette lighter socket of a vehicle. two oppositely formed negative electrode through holes 506 (see FIG. 8) are formed in the plug-in portion 501, two elastic negative electrodes 8 are disposed on the housing, and the two elastic negative electrodes 8 pass through the two negative electrode through holes 506, respectively. A positive electrode 9 is disposed at a lower end of the bottom shell 6, and the elastic negative electrodes 8 and the positive electrode 9 are all electrically connected to the PCB 1. A positive electrode connecting wire 10 and a positive electrode spring 11 are further disposed on the housing, a length direction of the positive electrode spring 11 is along a vertical direction of the housing, an upper end of the positive electrode connecting wire 10 is connected to the PCB 1 and a lower end of the positive electrode connecting wire 10 is connected to a contact plate, the contact plate is connected to the lower end of the positive electrode spring 11 by soldering, and the positive electrode spring 11 presses the contact plate at the lower end of the positive electrode connecting wire 10 against an inner wall of the positive electrode 9. The contact plate can be omitted at the lower end of the positive electrode connecting wire 10, the lower end of the positive electrode connecting wire 10 is directly connected to the lower end of the positive electrode spring 11 by soldering, and in this case, the positive electrode spring 11 presses the lower end of the positive electrode connecting wire 10 against the inner wall of the positive electrode 9, thereby achieving an electrical connection between the positive electrode 9 and the PCB 1.

As shown in FIG. 1 and FIG. 6, the cover plate 7 is disc-shaped, a plurality of elastic walls 703 are arranged along a circumferential direction of the cover plate at an outer end of the cover plate 7, a snap-fit protrusion 704 is disposed on each of the elastic walls 703, a snap-fit structure adapted to the snap-fit protrusion 704 is disposed on an inner wall of the handheld portion 502, and the snap-fit structure can either be a clamping groove or a circular ring-shaped protrusion disposed on the inner wall of the handheld portion 502, such that the cover plate 7 is snap-fitted into the upper port 503 of the handheld portion 502.

Figure 4:
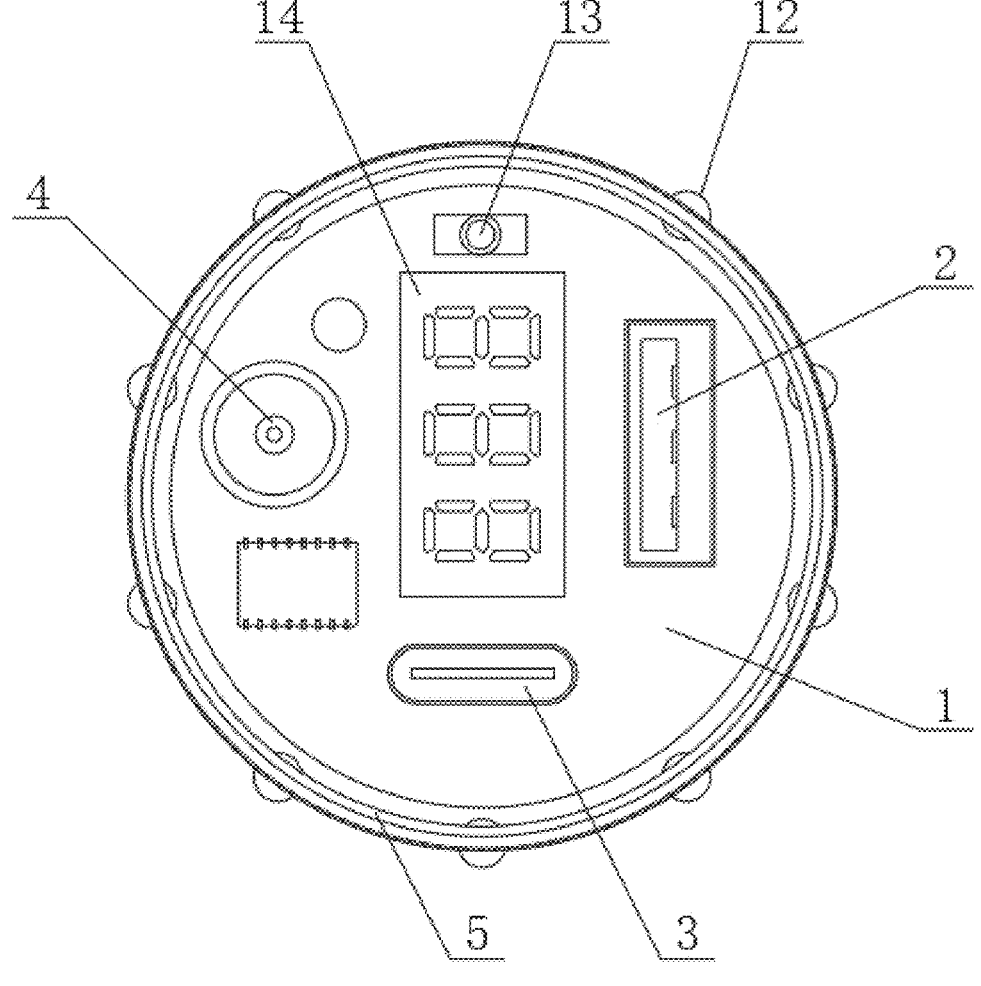
FIG. 4 is a top view of the present disclosure without a cover plate.
Figure 5:
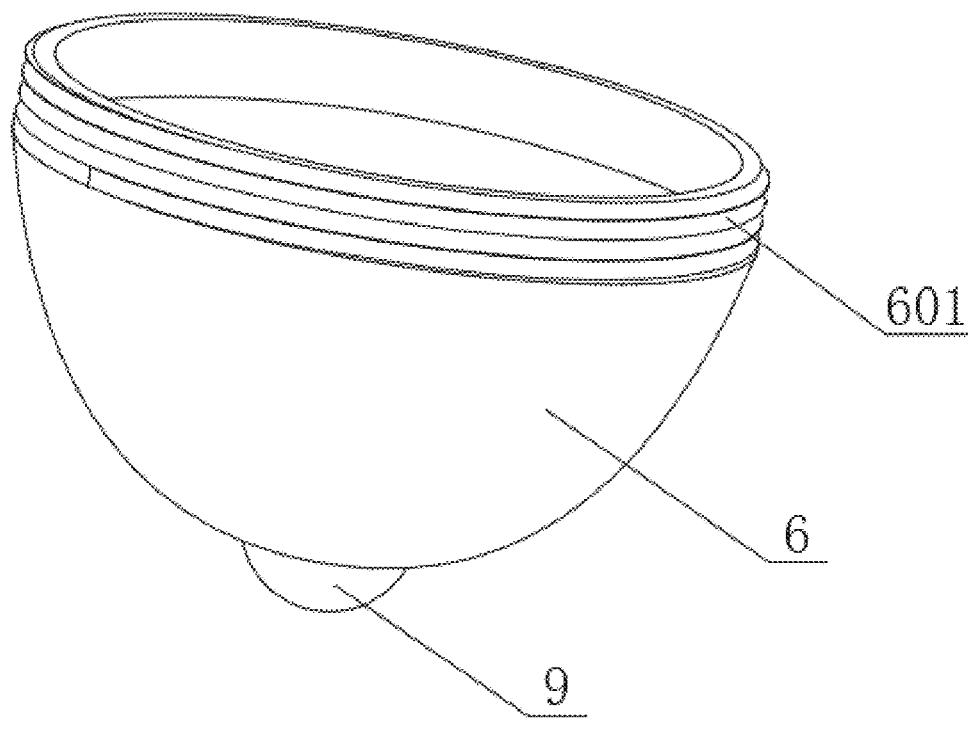
FIG. 5 is a schematic perspective view of the bottom shell of the present disclosure.

As shown in FIG. 1, FIG. 4, and FIG. 6, a plurality of light emitting diode (LED) lamp beads 12 are arranged in the handheld portion 502 along a circumferential direction, lamp holes in one-to-one correspondence with the LED lamp beads 12 are formed in the handheld portion 502, and the LED lamp beads 12 are all electrically connected to the PCB 1. Under normal circumstances, a lighting lamp is only disposed on the top inside a vehicle, which results in poor visibility of the inner bottom of the automobile when the light is dim, making it inconvenient to find articles that fall onto the inner bottom of the automobile. Generally, the cigarette lighter socket of the vehicle is closer to the inner bottom of the vehicle. By arranging the LED lamp beads 12, the vehicle-mounted charger provided by the present disclosure can be inserted into the cigarette lighter socket and used as a lighting lamp. The vehicle-mounted charger can better illuminate the inner bottom of the vehicle, facilitating the user to find articles that have fallen onto the inner bottom of the vehicle. A control switch 13 is disposed on the PCB 1, a switch hole 702 is formed in the cover plate 7 at a position corresponding to the control switch 13, an upper end of the control switch 13 passes through the switch hole 702, and the control switch 13 is configured to control turnon and turnoff of the LED lamp beads 12. In addition, a storage battery 15 is further disposed in the housing, and the storage battery 15 is electrically connected to the PCB 1 and can supply power to the LED lamp beads 12, such that after the vehicle-mounted charger provided by the present disclosure is separated from the cigarette lighter socket, the vehicle-mounted charger can also be used as a lighting lamp before the storage battery 15 is fully depleted, which further expands the usage scenarios of the vehicle-mounted charger provided by the present disclosure.

As shown in FIG. 4, a display screen 14 is further disposed on the PCB 1. The display screen 14 can be configured to display a charging voltage, an operating state, an electric quantity of the storage battery 15, and the like. A display window is disposed at a position of the cover plate 7 corresponding to the display screen 14 or the entire cover plate 7 is made of a light-transmitting material, such that the user can clearly see the content displayed on the display screen 14.

To sum up, the vehicle-mounted charger provided by the present disclosure is provided with the USB female socket 2, the TYPE-C female socket 3, and the DC female socket 4, and can charge various electronic devices with the USB port, the TYPE-C port, and the DC port, such that usage scenarios are effectively expanded.

The above is only preferred embodiments of the present disclosure and is not intended to limit the present disclosure; for those skilled in the art, various modifications and changes may be made to the present disclosure. Any modifications, equivalent substitutions, improvements, and the like made within the spirit and principles of the present disclosure shall be included within the protection scope of the present disclosure.

What is claimed is:

1. A vehicle-mounted charger, comprising a housing, a printed circuit board (PCB) disposed in the housing, and a universal serial bus (USB) female socket, a TYPE-C female socket, and a direct current (DC) female socket disposed on the PCB, wherein the housing comprises an upper shell and a bottom shell, the upper shell is provided with an upper port and a lower port, the bottom shell is detachably connected to the lower port of the upper shell, a cover plate is disposed at the upper port of the upper shell, and jack structures, which are in one-to-one correspondence with the respective female socket interfaces and respectively adapted to the shapes thereof are disposed on the cover plate;

wherein a plurality of light emitting diode (LED) lamp beads are arranged in the handheld portion along a circumferential direction, lamp holes in one-to-one correspondence with the LED lamp beads are formed in the handheld portion, and the LED lamp beads are all electrically connected to the PCB.

2. The vehicle-mounted charger according to claim 1, wherein an internal thread structure is disposed on the lower port of the upper shell, an external thread structure is disposed on the upper port of the bottom shell, and the bottom shell and the upper shell are connected through the thread structures.

3. The vehicle-mounted charger according to claim 1, wherein the upper shell comprises a plug-in portion and a handheld portion, the handheld portion is located at an upper end of the plug-in portion, cross sections of the plug-in portion and the handheld portion are all circular and the plug-in portion and the handheld portion share a common central axis, an outer diameter of the handheld portion is greater than an outer diameter of the plug-in portion, and the plug-in portion is configured to be inserted into a cigarette lighter socket of a vehicle.

4. The vehicle-mounted charger according to claim 3, wherein two oppositely formed negative electrode through holes are formed in the plug-in portion, two elastic negative electrodes are disposed on the housing, and the two elastic negative electrodes pass through the two negative electrode through holes, respectively; and a positive electrode is disposed at a lower end of the bottom shell, and the elastic negative electrodes and the positive electrode are all electrically connected to the PCB.

5. The vehicle-mounted charger according to claim 4, wherein a positive electrode connecting wire and a positive electrode spring are further disposed on the housing, a length direction of the positive electrode spring is along a vertical direction of the housing, an upper end of the positive electrode connecting wire is connected to the PCB and a lower end thereof is connected to a lower end of the positive electrode spring, and the positive electrode spring presses the lower end of the positive electrode connecting wire against an inner wall of the positive electrode.

6. The vehicle-mounted charger according to claim 1, wherein a control switch is disposed on the PCB, the control switch is configured to control turn-on and turnoff of the LED lamp beads, a switch hole is formed in the cover plate at a position corresponding to the control switch, and an upper end of the control switch passes through the switch hole.

7. The vehicle-mounted charger according to claim 6, wherein a storage battery is disposed in the housing, the storage battery is electrically connected to the PCB, and the storage battery is capable of supplying power to the LED lamp beads.

8. The vehicle-mounted charger according to claim 1, wherein a display screen is further disposed on the PCB, and a display window is disposed at a position of the cover plate corresponding to the display screen or the entire cover plate is made of a light-transmitting material.

9. The vehicle-mounted charger according to claim 3, wherein the cover plate is disc-shaped, a plurality of elastic walls are arranged along a circumferential direction of the cover plate at an outer end of the cover plate, a snap-fit protrusion is disposed on each of the elastic walls, a snap-fit structure adapted to the snap-fit protrusion is disposed on an inner wall of the handheld portion, and the cover plate is snap-fitted into the upper port of the handheld portion.

* * * * *